United States Patent [19]
Jackson et al.

[11] 3,973,849
[45] Aug. 10, 1976

[54] SELF-CALIBRATABLE SPECTRUM ANALYZER

[75] Inventors: Ralph Newton Jackson, Endicott; Richard Wilhelm Kern, Vestal; Alvin Hu Tong, Poughkeepsie, all of N.Y.

[73] Assignee: International Business Machines Corporation, Armonk, N.Y.

[22] Filed: June 16, 1975

[21] Appl. No.: 587,459

[52] U.S. Cl. .................................. 356/97; 356/83; 356/95
[51] Int. Cl.² .......................................... G01J 3/42
[58] Field of Search ................... 356/83, 84, 88, 93, 356/94, 95, 96, 97, 188, 189, 207

[56] References Cited
UNITED STATES PATENTS

| | | | |
|---|---|---|---|
| 3,680,957 | 8/1972 | Fukuda | 356/97 |
| 3,700,331 | 10/1972 | White | 356/83 |
| 3,734,621 | 5/1973 | Moody et al. | 356/95 |
| 3,740,155 | 6/1973 | Keller | 356/188 |
| 3,838,925 | 10/1974 | Marks | 356/207 |
| 3,874,779 | 4/1975 | Isaacs et al. | 356/97 X |
| 3,886,331 | 5/1975 | Schierer, Jr. | 356/83 X |

*Primary Examiner*—John K. Corbin
*Assistant Examiner*—F. L. Evans
*Attorney, Agent, or Firm*—Norman R. Bardales

[57] ABSTRACT

A spectrum analyzer is disclosed which is of the type that utilizes an electrically scannable array of optical detectors. The array is selectively illuminated, i.e. irradiated, by at least two portions of a spectral band image of radiation. One of the portions is associated with a first spectral range and the other portion is associated with a second spectral range. The first and second ranges include mutually exclusive first and second spectral components, respectively, and a common third spectral component which is intermediate of the other two components. The detectors are calibrated by means which include a pair of optical filters. One of the filters is a single narow band transmission which has a transmission characteristic corresponding to one of the three aforementioned spectral components. The other filter is a double, i.e. two, narrow band transmission filter which has a transmission characteristic corresponding to the other two spectral components. In this way, the number of calibrating filters used in the system during the calibration mode is minimized and simplified than would otherwise be the case if a separate filter for each of the three spectral components were to be utilized.

14 Claims, 12 Drawing Figures

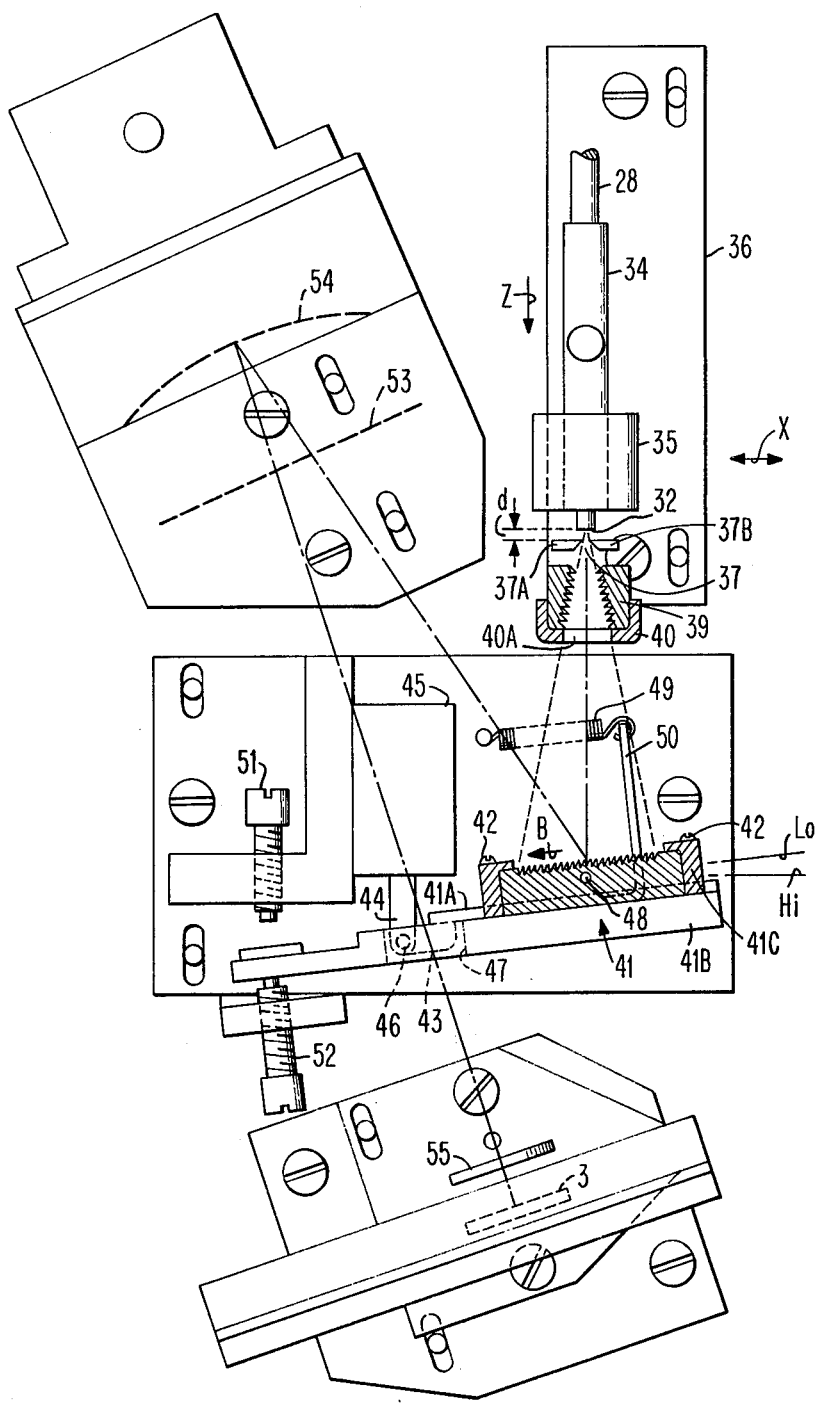
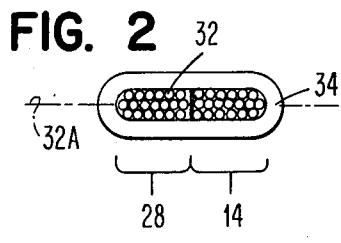
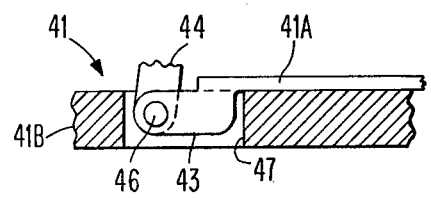

a# SELF-CALIBRATABLE SPECTRUM ANALYZER

BACKGROUND OF THE INVENTION

1. Field of the Invention

This invention is related to spectral analyzers and, more particularly, to the calibration thereof.

2. Description of the Prior Art

The use of dectector arrays for spectral analysis is well-known in the prior art. These prior art devices are often complex and/or not amenable to self or automatic calibration and/or are subject to error. Furthermore, this is particularly disadvantageous when the spectral analyzer uses a data processor such as, for example, a multiprocessor or a general purpose computer to process the spectrometric data derived therefrom and/or is under computer control.

SUMMARY OF THE INVENTION

It is an object of this invention to provide a spectral analyzer employing a detector array which is capable of self-calibration in a simple and/or automatic manner.

It is another object of this invention to provide a spectral analyzer of the aforementioned kind in which the detector array is capable of being illuminated by at least two portions of a radiation spectrum image.

Another object of this invention is to provide a spectral analyzer of the aforementioned kind which is readily amenable to computer data processing and/or control.

Still another object of this invention is to provide a spectral analyzer of the aforementioned kind which is embodied as a spectrophotometer.

Still another object of this invention is to provide a spectral analyzer of the aforementioned kind that is a dual beam type and is capable of self-calibration with either or both of the two beams.

Still another object of this invention is to provide a spectral analyzer of the aforementioned kind that is capable of attenuation compensation for different radiation transmission conditions.

According to one aspect of the invention, there is provided spectral analyzer apparatus that has a source of radiation which provides at least one beam of radiation with a predetermined spectral bandwidth characteristic. A spectral band image converter, which includes radiation dispersing means that is incident to the beam and spectrum imaging means, provides a spectral band image, i.e. a spectrum image, of the beam. Selective irradiating means irradiates an array of detectors with at least two portions of the spectral band image. One of the portions is associated with a predetermined first spectral range. The other portion is associated with a predetermined second spectral range. The first and second ranges include mutually exclusive first and second spectral components, respectively, as well as a common spectral component intermediate of the first and second spectral components. The detectors of the array are electrically scannable in a predetermined sequence. Calibrating means for calibrating the detectors for the first and second ranges are provided which includes first and second narrow band optical filters and means for disposing these filters in the radiation beam. The first and second filters are single and double narrow bandpass filter types, respectively. The first filter has a spectral transmission characteristic corresponding to one of the three aforementioned spectral components. The second filter has a spectral transmission characteristic corresponding to the other two spectral components.

The foregoing and other objects, features and advantages of the invention will be apparent from the following more particular description of the preferred embodiments of the invention as illustrated in the accompanying drawing.

BRIEF DESCRIPTION OF THE DRAWING

FIG. 2 is an end view of certain fiber optic cables shown in FIG. 1;

FIG. 3 is a more detailed elevation view of the monochromator portion of the apparatus of FIG. 1 as viewed from the direction of the arrow AA shown therein;

FIG. 4 is a partial enlarged detail view, shown partially in cross-section, of the selective irradiating means shown in FIG. 3;

In the FIGURES, like elements are designated with similar reference numbers.

DESCRIPTION OF THE PREFERRED EMBODIMENTS

Figure 1:
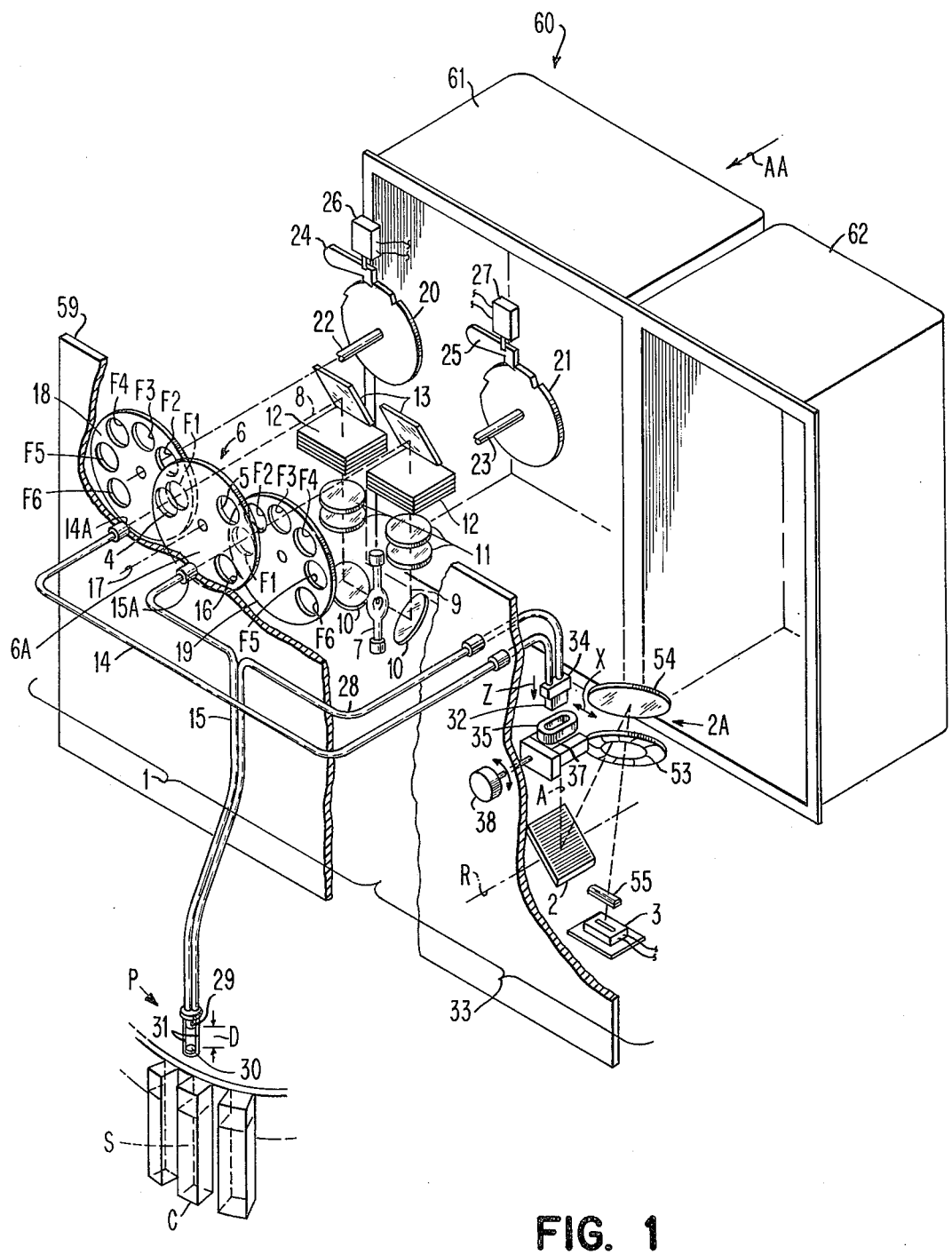
FIG. 1 is a perspective and exploded view, partially broken away, of a preferred embodiment of the spectrum analyzer apparatus of the present invention.

Referring now to FIG. 1, there is shown a simplified schematic of a preferred embodiment of the spectral analyzer apparatus, also sometimes referred to herein as a spectrum analyzer apparatus, of the present invention. In FIG. 1, the apparatus is configured as a dual beam system. As will become apparent from the description hereinafter, either or both of the beams of the system can be used to calibrate the apparatus.

In general, the two radiation beams are provided by a source generally indicated by the reference numeral 1. Each of the beams from source 1 is transmitted along a common path A towards a spectral band image converter that includes radiation dispersing means 2 which is incident to the particular beam. Means 2 disperses the incident beam into a spectrum and is preferably a reflection type plane diffraction grating. The dispersed beam in turn is reflected by spectrum imaging means 2A, which is part of the aforementioned spectral band image converter sometimes referred to herein also as the spectrum image converter.

An array 3 of plural optical detectors is selectively irradiated with two portions of a spectral band image that is provided by the spectrum image converter via its imaging means 2A. In FIG. 1, the preferred means for accomplishing the selective irradiating of the array 3 is omitted for sake of clarity, but is described hereinafter in greater detail with reference to FIGS. 3 and 4.

One of the two aforementioned spectral band image portions is associated with a predetermined first spectral range and the other portion is associated with a second spectral range. The first and second ranges include mutually exclusive first and second spectral components, respectively. The two ranges also include a common spectral component intermediate of the first two components.

As contemplated by the present invention, calibrating means, which in the embodiment of FIG. 1 include two narrow band optical filters 4 and 5, are provided to calibrate the array 3 of detectors for the two aforementioned ranges. The filters 4 and 5 are disposed in the radiation beams in a predetermined manner by suitable means, which in the preferred embodiment includes a rotatable chopper wheel assembly 6 having a chopper wheel 6A that is driven by a motor, not shown for sake of clarity. Filter 4 has a spectral transmission characteristic corresponding to one of the aforementioned three spectral components associated with the two ranges. Filter 5 has a spectral transmission characteristic corresponding to the other two spectral components. Filters 4, 5 are utilized during the calibration mode of the apparatus of FIG. 1.

The spectrum analyzer apparatus of FIG. 1, is furthermore preferably embodied as a spectrophotometer. It includes, inter alia, a light source 7 such as an adjustable high intensity lamp. Lamp 7 is adapted to be connected to an external adjustable power supply, not shown, and preferably one that is controllable by a data processor. Source 7 provides light with a broad band emission characteristic preferably in the visible spectrum, i.e. white light. Lamps suitable for this purpose are quartz-iodine, tungsten filament or Xenon arc lamp types, for example. Furthermore, the apparatus of FIG. 1 may be modified to utilize interchangeable different lamp types if desired. To form the radiation from lamp 7 into two beams, the light from lamp 7 is divided into two channels or optical paths 8, 9, hereinafter sometimes referred to as the reference and test channels respectively.

More specifically, each of the optical paths 8, 9 includes inter alia an optical path folding lower mirror 10, a condenser lens system 11, an optional compensating filter 12 and an upper folding mirror 13. The two respective lens systems 11 of paths 8, 9 focus the light from lamp 7 into the input ends 14A, 15A, respectively, of a pair of flexible fiber optic cables 14, 15, which are also part of the paths 8, 9, respectively. Filters 12, if used, attenuate abnormal high intensities, which may be present at a specific wavelength in the light.

Disposed between the ends 14A, 15A and mirrors 13 is the aforementioned chopper wheel 6A. In addition to carrying the two calibration filter members 4, 5, the wheel 6A of assembly 6 also carries a transparent window member or opening 16. Member 16 is used during the spectrum analysis mode of the apparatus of FIG. 1. The three members 4, 5 and 16 are symmetrically disposed, both angularly and radially, about the axis 17 of rotation of wheel 6A. As the wheel 6A rotates, the ends 14A, 15A are thus alternately illuminated through the members 4, 5 and 16 in rotational sequence.

As also contemplated by the present invention, optimal compensation is preferably provided so as to allow the apparatus to handle a wide range of attenuation levels. To this end, in the embodiment of FIG. 1, two indexable filter wheels 18, 19 are disposed in the paths 8, 9, respectively. Each of the filter wheels 18 and 19 carries a series of plural, e.g. six, neutral density filters F0, F1, . . . F6, and F0', F1', . . . F6', respectively. For sake of simplicity, these filters are sometimes referred to herein simply by the letter prefix F of these reference characters. Each filter F of the same series is capable of attenuating the intensity of the light passing therethrough by a predetermined discrete different amount and uniformly over the entire spectral bandwidth of the light. Preferably, filters F1 – F6 have increasing attenuation characteristics, as do the filters F1' – F6'.

The wheels 18, 19 are indexed by respective suitable indexing mechanism. The indexing mechanisms are only partially shown in FIG. 1 for sake of clairty, and include the respective detent wheels 20 and 21 that are affixed to the respective shafts 22, 23. The shafts 22 and 23, which are affixed to filter wheels 18 and 19, are driven by the aforementioned chopper wheel motor, not shown, through gear trains, not shown, and appropriate slip clutches, not shown, or the like. Detent wheels 20, 21 coact with their respective detent arms 24, 25 which in turn are connected to their respectively associated electrically operated solenoids 26, 27. With an arm 24 or 25 located in a respective detent of its associated wheel 20, 21, rotation of the particular shaft 22, 23 is prevented while the aforementioned slip clutches still allow continuous rotation of the chopper wheel 6A.

When a solenoid 26 or 27 receives a short actuating pulse, the respective arm 24, 25 is lifted from the detent and the particular wheel 20, 21 is indexed to the next detent position. At this next detent position the arm 24 or 25 engages the particular detent and as a result, rotation of the particular wheel 20, 21 is again stopped or prevented. Each detent position on the wheels 20 and 21 is associated with a mutually exclusive one of the filters F of the wheels 18 and 19, respectively.

By way of example, an optical shaft position encoder and detector system is provided for each detent wheel 20, 21. The particular encoder and detector system provides an output signal indicative of the particular filter F which is presently in the particular path 8, 9 with which the wheels 18, 19 are associated.

Fiber optic cable 15 together with another fiber optic cable 28 are terminated in a bifurcated end 29 which forms an optical test probe P. In the embodiment of FIG. 1, the test probe P is preferably adapted to be immersed in a cell C containing a fluid or liquid sample S to be analyzed. It is provided with a reflector 30, which faces the bifurcated end 29. Reflector 30 is mounted a fixed distance D from end 29 by a detachable, i.e. demountable, adaptor shown as a pair of elongated narrow brackets 31 or the like. Thus, a fixed or uniform volume of liquid is placed between the reflector 30 and bifurcated end 29 of the cables 15, 28 each time the probe P is immersed in a sample S. Reflector 30 has preferably a concave first surface spherical reflector configuration. Alternatively, reflector 30 may have other configurations such as, for example, a second surface concave spherical reflector configuration, a second surface convex-concave spherical reflector configuration, a second surface plano-concave spherical reflector configuration, or in less efficient systems first or second surface planar reflector configurations. In addition, several adapters with different focal length reflectors 30 can be used interchangeably in the probe P, thus providing different optical path lengths, if desired. The fiber optic cables 15, 28 and probe P are part of the test channel. In the bifurcated end 29, the individual optical elements of cables 15 and 28 are arranged in a circular cross-sectional array, the elements of cables 15 and 28 being confined to mutually exclusive semi-circular cross-sectional halves thereof.

It should be understood that other types of probes and/or cross-sectional configurations for the end 29 can be interchangeably used for the apparatus of FIG. 1 with the aid of appropriate adaptors. For example, the reflective probe P' of FIG. 9 or transmissive probe p'' of FIG. 12 may be utilized and, for example, the elements of cables 15 and 28 may be arranged randomly in the end 29, or the elements of one cable may be arranged concentrically about a core formed of the elements of the other cable.

Fiber optic cable 14, which is part of the reference channel, and fiber optic cable 28 are also terminated in a bifurcated cable end 32. As shown in FIG. 2, the individual optical elements of cables 14, 28 are terminated at end 32 in a slit-like rectangular cross-sectional array having an elongated axis 32A. Half the array includes exclusively the fiber optic elements of cable 14 and the other half includes exclusively the elements of cable 28.

Referring now to FIGS. 1 and 3, the monochromator portion 33 of the spectrophotometer shown therein will next be described, the radiation beam source 1 being its illumination section. The bifurcated end 32 of the fiber optic cable pair 14, 28 is mounted in a T-shaped pluglike structure 34. A compatibly configured elongated ring-shaped receptacle structure 35 is affixed to a bracket 36, FIG. 3, that is mounted to the frame assembly, not shown. When the pluglike structure 34 is inserted in the direction of arrow Z into the receptacle 35, the end 32 is placed a fixed distance d from and in close proximity to the elongated symmetrically adjustable slit opening 37 formed by the knife edges of two partially shown movable plates 37A, 37B, in FIG. 3, and the center elongated axis 32A of end 32 is in parallel symmetrical alignment with the elongated slit 37. Adjustment of the slit opening 37 is effected by a suitable mechanism, not shown for sake of clarity. The slit adjustment mechanism moves the plates 37A, 37B in unison towards and away from each other, cf. bidirectional arrow X, via the bidirectional rotatable adjusting knob 38 between fully open and fully closed positions. The slit opening 37 is judiciously adjusted to optimize the resolution and intensity of the light image projected on the diffraction grating 2.

The light passing through slit 37 passes through a conical light baffle formed on the inner surface of hollow member 39, FIG. 3, to reduce or minimize stray light into the system. Member 39, which has a cylindrical outer shape, is terminated with a concentric light stop member 40 having a square aperture 40A. For sake of clairty, baffle 39 and member 40 are omitted in FIG. 1 and are shown in cross section in FIG. 3. The light exiting from aperture 40A strikes the diffraction grating 2 which is blazed in the direction indicated by the arrow B. Aperture 40A confines the emerging light beam so that only the effective grating area of grating 2 is substantially illuminated with the beam and thus further reduces the stray light in the system.

Referring now to FIGS. 3 and 4, grating 2 is mounted ot a pivotable lever assembly 41. More particularly, lever assembly 41 has a resilient springplate member 41A interconnected to a rigid member 41B. Suitable mounting means such as a clamp member 41C and screws 42 clamps the grating 2 directly to the rigid member 41B. An end portion 43 of resilient member 41A is configured as a yoke. The yoke portion 43 straddles the armature 44 of a solenoid 45 and is pivotable secured to the armature 44 by a pivot pin 46. The yoke portion 43 and armature 44 are disposed in an opening 47, cf. FIG. 4, provided in the rigid member 41B. Lever assembly 41 pivots about a pivot shaft 48, FIG. 3, which is concentric with the pivot axis R, FIG. 1. A return spring 49 is connected to the lever assembly 41 via a link 50. The lever assembly 41 is positioned between two adjustable stops 51, 52. In the unretracted position of the solenoid armature 44, spring 49 maintains the lever assembly 41 in a first position as shown in FIG. 3 against stop 52. When the armature 44 is retracted, the lever assembly 41 is placed in a second position, not shown, against stop 51. Member 41A dampens the high energy impact forces caused when the lever assembly 41 strikes the stop 51 as a result of the retraction of the armature 44 which occurs when solenoid 45 is energized. The spring characteristics of spring 49 are such that the impact forces, which are caused when the lever assembly 41 strikes the other stop 52 by the action of the return spring 49, are less severe and/or cushioned, i.e. dampened, by the spring 49 per se.

In either of the two positions, the light beam dispersed by the grating 2 is passed through the opening of an adjustable iris diaphragm 53 and is reflected back through the diaphragm opening by the imaging means 2A which is preferably a concave spherical reflector 54. Means 2A forms an image of the spectrum that is projected toward the array 3 of photodetectors. Juxtaposed in front of the array 3 is an elongated cylindrical lens 55 which is substantially co-extensive with the array 3. For sake of clarity, the diaphragm 53 is shown in schematic outline form in FIG. 3.

Figure 5:
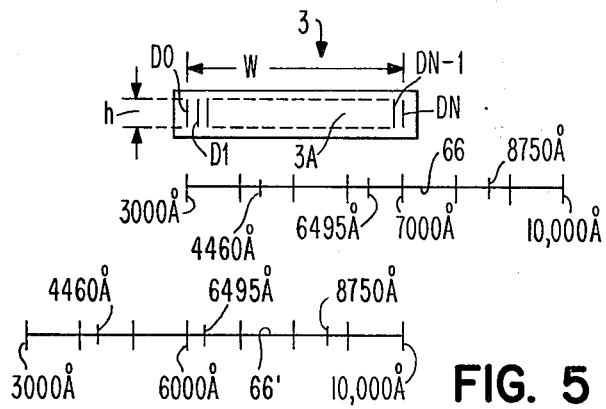
FIG. 5 is a schematic plan view of a preferred photodetector array shown in FIGS. 1 and 2.

The opening of iris diaphragm 53 is adjusted to optimize the quality, i.e. resolution, and intensity of the particular portion of the spectral band image projected on the array 3 of photodetectors D0, D1 . . . DN. Array 3, which is shown schematically in FIG. 5, is preferably a monolithic array of semiconductor photoconductors. The photodetectors are adapted to be periodically electrically scanned in synchronization with the rotation of wheel 6A. Cylinder lens 55 reduces the respective height of the two separated and alternate spectral band images derived from the reference and test channels, respectively, via the cables 14 and 28 at end 32 and focuses them onto a more centralized common portion of the detector array 3. Each of the two spectrum images, which are derived from the test and reference channels, respectively, and projected towards array 3, have two orthogonal planar dimensions referred to as its height and width dimensions. The individual spectral components of the particular spectrum image are aligned normal to and along its width dimension. The width and height dimensions of the spectrum images are parallel to the length W and height h, respectively, of the photodetector array 3, cf. FIG. 5. For the configuration of cable end 32 shown in FIG. 2, the test channel derived spectrum image and reference channel derived spectrum image are projected spatially separated and in substantially parallel alignment with their respective width dimensions. The width dimensions of the images are greater than the length W of array 3 and the corresponding co-extensive axial length of cylinder lens 55. Cylinder lens 55 thus reduces the height of that portion of the particular spectrum image projected therethrough and also focuses or concentrates the particular spectrum portion onto a more centralized and common region, shown in FIG. 5 as a dashline 3A of array 3.

Figure 6:
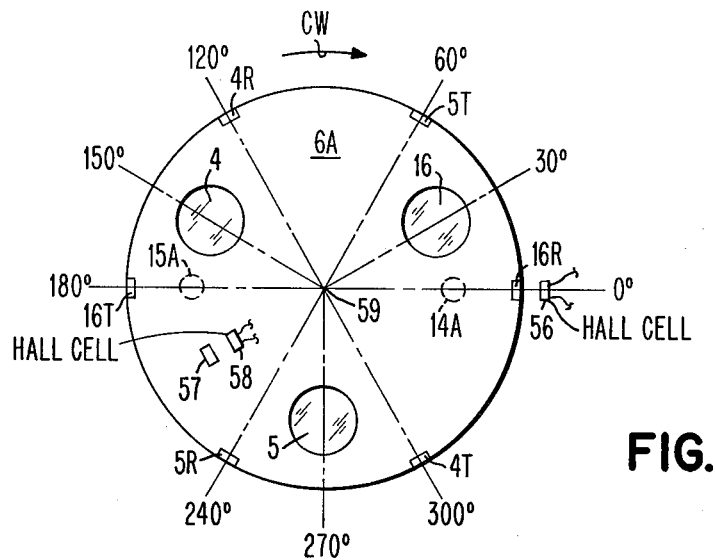
FIG. 6 is an elevation view of the chopper wheel shown in FIG. 1 as viewed from the direction of the arrow AA shown therein.

Referring now to FIG. 6, symmetrically disposed on the periphery of the chopper wheel 6A are six illumination sequencing timing magnets 4T, 4R, 5T, 5R, 16T and 16R. A sensing device such as a Hall cell 56 is mounted to the apparatus frame, not shown, in close proximity to the trajectory of the six magnets. Hall cell 56 provides an output signal, each time it senses one of the six magnets 4T, 4R, etc. In addition, a reference position magnet 57 is mounted inwardly on the chopper wheel 6A and is sensed by a sensing device 58, which can also be a Hall cell, that is mounted on the apparatus frame, not shown. The output signal of cells 56, 58 are utilizable as control and synchronization signals for the apparatus of FIG. 1.

The apparatus of FIG. 1 is suitably mounted to a frame assembly which includes the front panel 59A of a housing assembly 59. An integral cover of the assembly 59 has two light-tight compartments 59B, 59C that house portions 1 and 33, respectively, except for those external portions of the fiber optic cables 14, 15, 28, and the calibrated control knob 38 for adjusting slit 37 and the calibrated control knob, not shown for sake of clarity, for adjusting the diaphragm 53. Compartment 59B also houses the aforementioned motor, gear trains and slip clutches associated with the chopper wheel 6A and filter wheels 18, 19. Housed in compartment 59B is also the aforementioned optical shaft position encoder and photodetector systems associated with the neutral density filter wheels 18, 19. Compartment 59B can also house a blower system, not shown, if it is required to keep the illumination section 1 below a desired temperature level, as well as any detector circuitry that may be employed, if desired, to monitor light fluctuations in the lamp 7. Compartment 59C also houses appropriate scanning and detector circuits, not shown, that are associated with array 3 and which are also preferably configured as integrated circuits. Appropriate electrical terminals, not shown, are provided on the panel 59A and/or compartments 59B, 59C for electrical power and signal interconnection to the apparatus contained therein.

As is apparent to one skilled in the art, the apparatus of FIG. 1 is particularly adapted to be operated in a fully automatic mode by a data processor system, not shown, which not only analyzes the output signals derived from the array 3, but which also in response to these output signals can provide control signals for operating the solenoids 26, 27, and/or 45 or is programmed to operate the solenoid 45 on a periodic basis. In addition, the data processor in response to the signals derived from sensor devices 56, 58 provides a synchronization signal for synchronizing the scanning of the array 3 with the rotation of the wheel 6A. Alternatively, the apparatus of FIG. 1 can be modified to operate in a semi-automatic and/or manual mode, the output signals, array 3 being fed to an appropriate utilization means such as, for example, a computer or display device.

The operation of the apparatus will be described hereinafter with respect to its preferred aforementioned spectrum analyzer and calibration modes under corresponding appropriate headings. However, prior to the description of these last two mentioned modes, the preferred initialization operation of the apparatus of FIG. 1 is next described under the headings System Turn-On and Attenuation Compensation.

System Turn-On

Prior to system turn-on, chopper wheel 6A is stationary, and each of the neutral density filter wheels 18, 19 has a filter F aligned with the end 14A, 15A, with which the particular wheel 18, 19 is associated. In addition, grating 2 is in the position shown in FIG. 3, being held against the stop 52 by the action of spring 49.

When the system power is turned on, the lamp 7 is lit and its intensity level set by the operator to a predetermined value. Also, the chopper wheel motor, not shown, is energized and causes the wheel 6A to rotate continuously at constant speed in the direction of the arrow CW shown in FIG. 6. It is assumed that at this time the probe P is not immersed in a sample S to be analyzed. During the initial start-up period, appropriate adjustments are made by the operator, if required, to the slit 37 and diaphragm 53.

Attenuation Compensation

Preferably, in the present invention, the spectrum analysis of the sample is done by correlating the two sets of output data signals from the photodetector array obtained when the test probe is in operative and in non-operative relationship, respectively, with the sample all other things being the same as hereinafter explained in the description of the spectrum analysis mode. That is to say, the two sets of data are obtained using the same lamp intensity level and filter F of wheel 19 in the test channel for the aforesaid operative and non-operative relationships, and hereinafter referred to sometimes as the loaded and unloaded test channel, respectively. For the particular test probe P, the test channel of the apparatus of FIG. 1 is loaded and unloaded when the probe P is immersed and not immersed, respectively, in the liquid sample S.

Attenuation compensation of the present invention gives the spectrum analyzer the ability to analyze a wide range of absorption levels so that the light passed through the loaded and unloaded transmission channel does not drive the photodetector array 3 below its threshold level or into saturation.

After start up and during the initialization period, the test channel is loaded with the sample to be analyzed. Each time the wheel 6A rotates and its window 16 fully exposes the end 15A, the array 3 is synchronizing scanned as is explained in greater detail hereinafter in the description of the spectrum analysis mode. The attenuation compensation is begun by detecting the output signal condition of the array 3 in response to the light being transmitted through the test channel during one of the revolutions of wheel 6A.

If an output signal condition, other than a saturation condition, is detected, the resultant data output signal is correlated by the data processor with the data of the attenuation characteristics of the filters F of wheel 19 and the particular lamp intensity level utilized so as to determine the optimal lamp intensity level and filter F of wheel 19 combination which allows the most efficient amount of light to be transmitted to the array 3 for both the loaded and unloaded conditions of the test channel. The data processor provides control signals that positions the optimal filter F of wheel 19 in the test channel, adjusts the lamp power supply to provide the optimal intensity level, and also computes and provides control signals that positions a filter of wheel 18 on the reference channel that allows the most efficient amount of light to be transmitted to the array 3 through the reference channel for the aforesaid optimal lamp intensity level. The apparatus is then ready for the spectrum analysis mode.

If a saturation condition is detected when the test channel is first loaded, the data processor in response thereto provides control signals to position successive filters F of wheel 19 with successively increasing attenuation characteristics into the test channel. If one of these filters causes a non-saturation output signal, the operation described in the previous paragraph is then performed. If, on the other hand, no output signal condition is detected when the test channel is first loaded, the data processor in response to this condition, provides control signals to position successively filters F of wheel 19 with successively decreasing attenuation characteristics into the test channel. If one of these filters cause a non-saturation output signal, the operation described in the previous paragraph is then performed. In either of the lastmentioned cases, if no filter is found which can produce a non-saturation output signal, the data processor then provides control signals to the aforementioned lamp power supply, not shown, that causes the lamp intensity to be incremented in increasing or decreasing amounts, depending on the case, and if a detectable output signal is obtained, the operation described in the previous paragraph is then performed.

The aforedescribed attenuation compensation is performed for either one or both positions of the grating 2, as required.

If desired, a manual operable override with an external calibrated control knob can be provided on each shaft 22, 23, to allow the operator to position any filter F of the wheels 18, 19 in their respective aligned relationships with the ends 14A and 15A.

With optimum attenuation compensation achieved, the apparatus of FIG. 1 is now ready for operation in its spectrum analyzer and calibration modes.

Spectrum Analyzer Mode

By way of explanation, the wheel 6A is illustrated in FIG. 6 in its zero degree position relative to a fixed or stationary reference point. In the zero degree position, the Hall cell 58 is aligned with its associated magnet 57 and its resultant output signal indicates the beginning of one revoltuion of wheel 6A about its rotational axis 59. Also shown in FIG. 6, are the respective radii 0°, 30°, 60°, 120°, 150°, 180°, 240°, 270°, and 300° of wheel 6A which coincide with the respective elements 16R, 16, 5T, 4R, 4, 16T, 5R, 5, and 4T, respectively. In the zero degree position, the 0° radius and, consequently, the magnet 16R are aligned with the Hall cell 56. As a result, cell 56 provides an output signal in response to the magnet 16R. The ends 14A, 15A are shown in FIG. 6 in their respective positions relative to the wheel 6A. More particularly, the centers of the ends 14A, 15A are symmetrically aligned along the horizontal diameter of the wheel 6A as viewed in FIG. 6. Moreover, the centers of the ends 14A, 15A and the centers of the members 4, 5 and 16 are at equal radial distances from the axis 59, the ends 14A, 15A being disposed in a common plane which is in close spatial proximity and parallel relationship with the wheel 6A.

Figure 7:
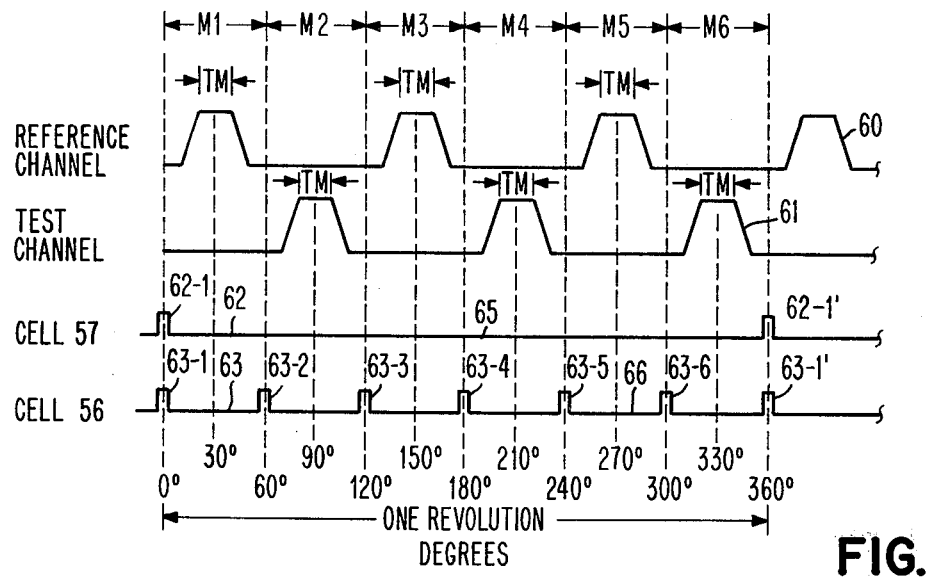
FIG. 7 is an idealized waveform timing diagram of an illustrative illumination sequence cycle example used to describe the operation of the embodiment of FIG. 1.

A typical cycle for one revolution of the wheel 6A commencing at the zero degree position and for the direction CW is shown by the waveforms of FIG. 7. Waveforms 60 and 61 illustrate the illumination sequence of the reference and test channels, respectively. The lower levels of the waveforms 60, 61 correspond to positions of the wheel 6A when it is blocking the radiation from lamp 7 into the particular ends 14A, 15A. As the wheel 6A rotates, the particular member 4, 5, 16 will begin to expose more and more of the particular end 14A, 15A to the beam. Eventually, the wheel 6A reaches a position in which the particular end 14A, 15A is completely, i.e. fully, exposed to the radiation through the particular member 4, 5, 16. This maximum or full exposure corresponds to the upper levels of the waveforms 60, 61 and continues until the particular member 4, 5, 16 begins to expose less and less of the particular end 14A, 15A to the beam due to the rotation of the wheel 6A. As the particular member 4, 5, 16 reaches a position whereby the wheel 6A again blocks the beam to the particular end 14A, 15A, the corresponding waveforms 60, 61 return to the lower level.

Also shown in FIG. 7 is the waveform 62 which corresponds to the output of the reference Hall cell 57. Thus, as shown in FIG. 7, waveform 62 provides an output pulse, e.g. pulse 62-1, at the zero degree position of the wheel 6A. Similarly, the waveform 63 corresponds to the output signal of the Hall cell 56. It provides output pulses 63-1, 63-2, . . . 63-6 at the corresponding zero degree, sixty degree, . . . three hundred degree, respectively, positions of the wheel 6A.

Thus, for the embodiment of FIG. 1 there are six equal phases M1, M2, M3, M4, M5, M6 for each revolution of the wheel 6A. Phases M1, M3 and M5 are associated with the reference channel and phases M2, M4 and M6 are associated with the test channel. During phases M1 and M4, the apparatus of FIG. 1 is operated in its spectrum analyzer mode. During phases M2, M3, M5 and M6 the apparatus operates in its calibration mode. The output signals of waveforms 62, 63 are decoded by the data processor and provide control signals which initiate a predetermined, preferably multiple, number of scans of the array 3 during each of the time periods TM associated with the phases M1, M2, etc.

In the first phase M1, the data processor processes the output signals of the array 3. It integrates these output signals if multiple scans are utilized. for the position of the grating 2 shown in FIG. 3, it will be assumed that the grating 2 projects across the array 3 of photodetectors D0, D1, . . . DN, that portion of the resultant spectrum image of the reference beam which lies in the spectral range of 3000 to 7000 angstroms, for example. In the other position of the grating 2, it will be assumed the portion of the spectrum image of the reference beam lies, for example, within the range 6000 to 10,000 angstroms. Thus, the individual components of the spectrum image of the reference beam are projected across the array 3 of photodetectors for the particular selected range. As a result, as each individual photodetector D0, D1, . . . DN is sequentially scanned in a serial manner, it provides an output signal whose amplitude is proportional to the intensity of the particular spectral component of the spectrum image by which it is illuminated. These reference channel output signals along with the address information of the photodetectors D0, D1, . . . Dn producing them are used to monitor the stability of the characteristics of the apparatus of FIG. 1 from cycle to cycle. In the preferred embodiment, they are processed by the data processor in such a manner that after the first cycle they are continually compared with the reference channel output signals of the previous cycle, there being for this purpose an appropriate buffer storage, not shown. The comparison signal is decoded by the processor and if no change is decoded, it provides a condition signal of the transmission characteristic stability integrity of the apparatus of FIG. 1 during the particular cycle which initiation signal is correlated with the data obtained in the succeeding phase M4 to indicate that the test channel data is valid. If a change is decoded, which occurs, for example, because of changes in the light emission characteristics such as fluctuations and the like, then the resultant correlation signal is correlated with the test channel data obtained in the succeeding phase M4 to indicate the test channel data is invalid.

During the other phase M4 associated with the spectrum analyzer mode, a similar operation is performed with the test beam. However, the operation is periodically or aperiodically made with the test probe P in and out of the sample S. A comparison of the test channel integrated output signals derived during a predetermined number of phases M1 when the probe P is immersed in the sample S and the test channel integrated output signals derived during a predetermined number of phases M4 when the probe P is outside the sample S is made by the data processor to determine which spectral components are missing in the attached beam. As is well-known to those skilled in the art, those spectral components which are missing have been absorbed by the sample S and are qualitative and/or quantitative indications of the composition of the sample S. As is obvious to those skilled in the art, the analysis can be made over the complete range, i.e. 3000 to 10,000 angstroms by, for example, alternately switching the grating 2 between its two positions in two successive revolutions of the wheel 6A.

Calibration Mode

Figure 8:
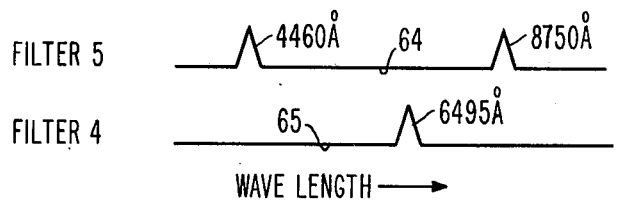
FIG. 8 is an idealized waveform diagram of the bandpass transmission characteristics of the calibration filters of the chopper wheel shown in FIGS. 1 and 6.

During the calibration mode, the photodetectors of the array 3 are calibrated with respect to the particular selected range being observed or analyzed during the spectrum analyzer mode. For the given example of ranges specified above, the bandpass transmission characteristic of the second order filter 5 is illustrated by the waveform 64 shown in FIG. 8. By way of example, it is selected to have narrow transmission bands at 4460 and 8750 angstroms. Similarly, the single order filter 4 has a narrow band transmission characteristic at 6495 angstroms as shown by waveform 65 in FIG. 8.

During the first calibration phase M2, the filter 5 is placed in optical communication with the end 15A of the test channel. As a result, the test beam illuminating the end 15A contains only radiation with the aforementioned 4460 and 8750 angstrom bandpass characteristics. Assuming that neither of these components are absorbed by the sample S, grating 2 for the position illustrated in FIG. 3 projects the central, i.e. peak, 4460 angstrom spectral component of the beam on a particular one of the detectors of the array 3. The other component 8750 angstroms is projected outside the detector array 3. As a result, when the array 3 is scanned during the time period TM of phase M2, the particular photodetector provides an output signal which senses, i.e. is illuminated by the particular 4460 angstrom spectral component. This output signal together with the address information of the particular diode is processed by the data processor as one of the calibration or reference points for calibrating the array 3 with the particular spectral range being analyzed. In the second calibration phase M3, a similar operation takes place with respect to the member 4 in the reference channel. Thus, in the phase M3, the computer processes the output signal of another photodetector of the array 3 which is being illuminated by the 6495 angstrom component passed by the filter 4.

During the phase M5, member 5 is placed in the reference channel and the photodetector illuminated by the 4460 angstrom component provides an output signal which is also processed by the data processor. Ideally and generally, the photodetector illuminated by the 4460 angstrom central component in phase M5 will be the same as the one illuminated in the phase M2. In the phase M6, the spectral component 6495 angstroms passed by the filter 4, which is disposed in the test channel, and results in the central spectral component 6495 being projected by the grating 2 to illuminate a particular one of the photodetectors of the array 3. Again, generally this photodetector will be the same as the one illuminated in phase M3. As is apparent to those skilled in the art, the data processor can be programmed to correlate the reference or calibration points established in the respective reference and test channels with the analysis data obtained in the reference and test spectrum analyzer modes, respectively. In other words, knowing which two of the photodetectors D0, D1 . . . DN are illuminated by the respective 4460 and 6495 angstrom components, the location of the other spectral components of the particular portion of the spectrum with respect to the other photodetectors can be determined.

Furthermore, as can be readily appreciated by those skilled in the art, the apparatus of FIG. 1 provides the spectral analysis and calibration data on a real time basis which makes it readily amenable to computer analysis and control. Moreover, the effects of drifts of the spectrum image along the elongated axis of the array 3 between successive pairs of calibration phases associated with a given channel are minimized since the relative spatial distance between the two spectral components of the spectrum are substantially fixed, i.e. constant. It should be noted that when the grating 2 is placed in its other position, as a result of lever assembly 41 being positioned against stop 51, the other spectral component 8750 angstroms is projected on the array 3 and the 4460 angstrom is not. By way of comparison, there is shown in FIG. 5 the juxtaposition of the beam spectrum image with respect to the array 3 when the grating 2, i.e. the lever 41, is against the stop 52 and when the grating 2, i.e. lever 41, is against the stop 51. For sake of clarity, the spectrum image is shown in FIG. 5 as a graduated bar, the bar 66 representing the spectrum when the lever 41 is against stop 52 and the bar 66' representing the spectrum image when the lever 41 is against the stop 51. It should be understood that in practice the spectrum image would be superimposed over the detector array 3, but is shown offset below the array 3 in FIG. 3 for sake of clarity. It should be understood that instead of moving the grating 2 to selectively illuminate or irradiate the array 3 with the two portions of the spectrum image, that alternatively the grating 2 may be in a fixed position and the detector array 3, together with lens 55, is moved with respect to the spectrum image.

Figure 9:
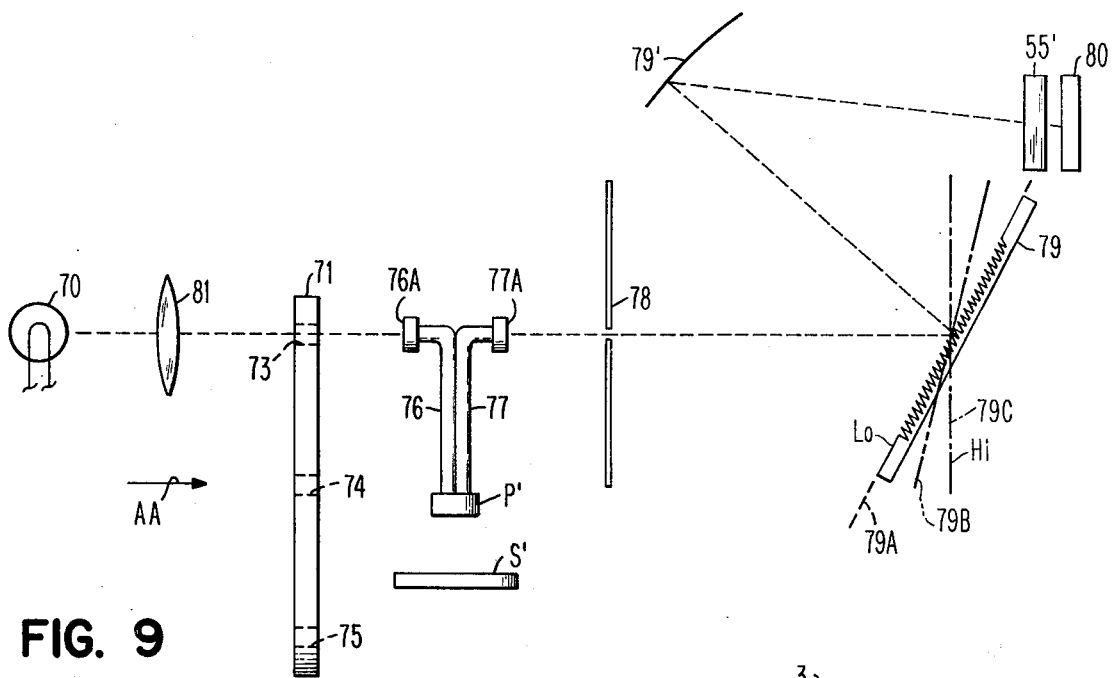
FIG. 9 is a simplified view shown in schematic form of another embodiment of the present invention.
Figure 11:
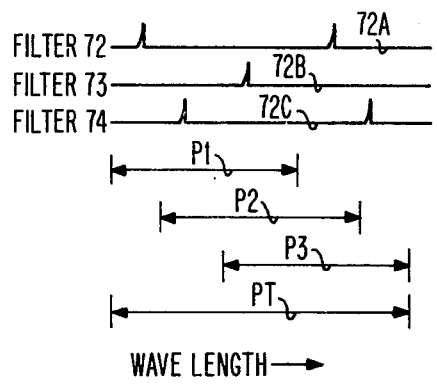
FIG. 11 is an idealized waveform diagram of the bandpass transmission characteristics of the calibration filters of the chopper wheel shown in FIGS. 9 and 10.
Figure 10:
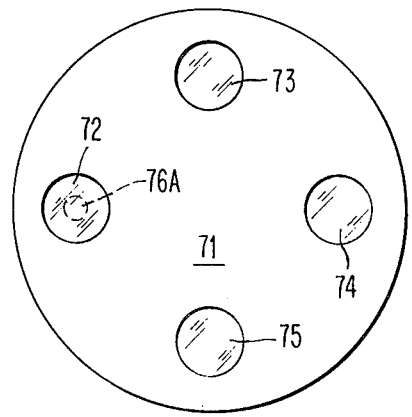
FIG. 10 is an elevation of the chopper wheel shown in FIG. 9, as viewed from its direction of the arrow AA' shown therein.

Referring now to FIGS. 9 – 11, there is shown a single beam embodiment of the apparatus of the present invention. For sake of clarity, the embodiment is shown in FIG. 9 in a simplified schematic form. It includes a radiation source shown as a high intensity lamp 70. A chopper wheel 71, cf. FIG. 10, has four symmetrically disposed optical members 72, 73, 74, 75. Members 72 – 74 are narrow band transmission members and the member 75 is a transparent window. Filters 72 and 74 are second order transmission types and filter 73 is a single order transmission type. Filters 72 – 74 have the transmission characteristics shown in the waveforms 72A, 72B, 72C, respectively of FIG. 11. The beam from radiation source 70 is periodically put into optical communication by the members 72 – 75 carried by the rotating optical chopper wheel 71 with the end 76A of a flexible fiber optic cable 76.

The other end of the cable 76 is terminated with another cable 77 as a bifurcated optical cable, the bifurcated end P' of which acts as a test probe. The other end 77A of flexible fiber optic cable 77 has an elongated configuration. The radiation from end 77A is projected through an adjustable slit 78 to a spectrum image converter which preferably includes radiation dispersing means 79, shown as plane diffraction grating in FIG. 9, and imaging means 79'. The grating 79 is selectively positionable to three positions indicated by the three longitudinal axes 79A, 79B and 79C shown in FIG. 9. In the position indicated by the reference numeral 79A, that portion P1, cf. FIG. 11, of the spectral range PT is projected onto a linear array 80 of photodetectors through the cylindrical lens 55'. In the second position 79B, only the portion P2 is projected on the array 80. In the third position 79C, only the portion P3 is projected on the array 80.

Condenser lens 81, shown schematically in FIG. 9, focuses the light from source 70 onto the end 76A. If desired, attenuation compensation means, not shown, may be provided for the embodiment of FIGS. 9 – 11.

In operation, window 75 is used during the spectrum analysis mode, and windows 72, 73, 74 are used for the calibration mode. As is obvious from the waveforms of FIG. 11, in the first position 79A, the low order wavelength components of the filters 72 and 74 and the common wavelength components of the filter 73 are used to calibrate the photodetector array 80 with the three particular spectral components represented thereby. In the position 79B, the low order spectral component passed by the filter 74 and the high order component passed by the filter 72 together with the spectral component passed by the filter 73 are used to calibrate the array 80. Likewise, in the position 79C, the two high order components of the filters 72 and 74 and the spectral component passed by the filter 73 are used to calibrate the array 80. In the spectrum analysis mode, probe P' is juxtaposed to a reflective sample S' to be analyzed. Thus, as the wheel 71 rotates, the spectrum analysis and calibration modes take place during each revolution of the wheel 71.

Figure 12:
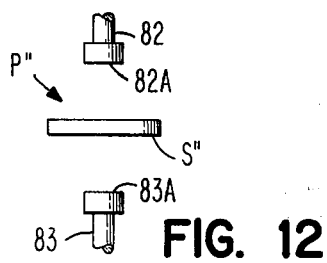
FIG. 12 is a view of a modification of the probe tip that can be used for the embodiments of FIGS. 1 and/or 9.

Referring now to FIG. 12, there is shown a modified sample probe P" which comprises a fiber optic cable 82 which transmits light from its end 82A through a transmissive sample S" being analyzed and into the end 83A of an output fiber optic cable 83. As is apparent to those skilled in the art, any of the three test probes P, P', P" can be interchanged with or used with either of the embodiments of FIGS. 1 and 9. Probes P' and P" are particularly useful for analyzing solid samples but can be also used to analyze fluid samples in which case the probes P', P" may be immersed or alternatively juxtaposed to the particular fluid sample depending on the application. In certain cases, the test probes may be calibrated periodically and/or initially against known standards.

As is obvious to those skilled in the art, other modes of operation and/or modifications to the invention may be employed such as, for example, synchronous or asynchronous operation. Likewise, for example, the operation of the spectrum analyzer mode of the apparatus of FIG. 1 can be modified so that in lieu of spectral analyzing the loaded and unloaded test channel data to obtain the resultant absorption characteristic of the sample, the loaded test channel data and the reference channel data can be correlated to obtain the absorption characteristic of the sample with an appropriate correction factor to compensate for the differences, if any, in the attenuation characteristics of the two particular ones of the filters F of wheels 18, 19 being utilized. A suitable photodetector array suitable for use in the present invention is described in the publication entitled "Reticon$^{TM}$ Solid-State Line Scanner RL-512, RL-256E" of the Reticon Corporation, No. 27202, copyright 1972.

While the invention has been particularly shown and described with reference to preferred embodiments thereof, it will be understood by those skilled in the art that the foregoing and other changes in form and details may be made therein without departing from the spirit and scope of the invention.

We claim:
1. Spectral analyzer apparatus comprising:
   a source of radiation for providing at least one beam of radiation having a predetermined spectral bandwidth characteristic;
   spectral band image converter means for providing a spectral image of said beam;
   plural optical electrical detectors disposed in an array, said detectors of said array being electrically scannable in a predetermined sequence,
   means for selectively irradiating said array of detectors with at least two portions of said spectral image, one of said portions being associated with a predetermined first spectral range, the other of said portions being associated with a predetermined second spectral range, said first and second ranges including mutually exclusive first and second spectral components, respectively, said first and second ranges having a common spectral component intermediate of said first and second spectral components, and
   means for calibrating said detectors for said first and second ranges, said means for calibrating including at least first and second narrow band optical filters and means for disposing said first and second filters in a predetermined manner in said radiation beam, said first and second filters being single and double narrow bandpass types, respectively, said first fitler having a spectral transmission characteristic corresponding to one of the three said spectral components and said second filter having a spectral trans- mission characteristic corresponding to the other two said spectral components.

2. Spectral analyzer apparatus according to claim 1 wherein said first and second filters are alternately disposed in said beam by said means for disposing.

3. Spectral analyzer apparatus according to claim 1 wherein said spectral band image converter means further comprises:
radiation dispersing means incident to said beam for dispersing said beam into a predetermined spectrum, and
imaging means in optical alignment with said radiation dispersing means for imaging said spectrum into said spectral image.

4. Spectral analyzer apparatus according to claim 3 wherein said radiation dispersing means is of the plane diffraction grating type.

5. Spectrophotometer apparatus for analyzing at least one sample, said apparatus comprising in combination:
a radiation source for providing at least one beam of radiation having a predetermined spectral bandwidth characteristic;
spectral band image converter means for providing a spectral image of said beam;
flexible fiber optic probe means providing a predetermined optical coupling relationship between the radiation beam from said source, said sample and said converter means;
plural optical electrical detectors disposed in an array, said detectors of said array being electrically scannable in a predetermined sequence,
means for selectively irradiating said array of detectors with at least two portions of said spectral image, one of said portions being associated with a predetermined first spectral range, the other of said portions being associated with a predetermined second spectral range, said first and second ranges including mutually exclusive first and second spectral components, respectively, said first and second ranges having a common spectral component intermediate of said first and second spectral components, and
means for calibrating said detectors for said first and second ranges, said means for calibrating including at least first and second narrow band optical filters and means for disposing said first and second filters in a predetermined manner in said radiation beam, said first and second filters being single and double narrow bandpass types, respectively, said first filter having a spectral transmission characteristic corresponding to one of the three said spectral components and said second filter having a spectral transmission characteristic corresponding to the other two said spectral components.

6. Spectrophotometer apparatus according to claim 5 wherein said first and second filters are alternately disposed in said beam by said means for disposing.

7. Spectrophotometer apparatus according to claim 5 wherein said spectral band image converter means further comprises:
radiation dispersing means incident to said beam for dispersing said beam into a predetermined spectrum, and
imaging means in optical alignment with said radiation dispersing means for imaging said spectrum into said spectral image.

8. Spectrophotometer apparatus according to claim 7 wherein said radiation dispersing means is of the plane diffraction grating type.

9. Spectrophotometer apparatus for analyzing at least one sample, said apparatus comprising in combination:
a radiation source for providing first and second beams of radiation having predetermined spectral bandwidth characteristics;
spectral band image converter means for providing spectral images of said beams;
flexible fiber optic probe means providing a predetermined optical coupling relationship between said first radiation beam from said source and said sample and said converter means;
fiber optic coupling means providing an optical coupling relationship directly between said second radiation beam and said converter means;
plural optical electrical detectors disposed in an array, said detectors of said array being electrically scannable in a predetermined sequence,
means for selectively irradiating said array of detectors with a first and second portion of each of said spectral images, one of said portions being associated with a predetermined first spectral range, the other of said portions being associated with a predetermined second spectral range, said first and second ranges including mutually exclusive first and second spectral components, respectively, said first and second ranges having a common spectral component intermediate of said first and second spectral components, and
means for calibrating said detectors for said first and second ranges, said means for calibrating including at least first and second narrow band optical filters and means for disposing said first and second filters in a predetermined manner in said radiation beam, said first and second filters being single and double narrow bandpass types, respectively, said first filter having a spectral transmission characteristic corresponding to one of the three said spectral components and said second filter having a spectral transmission characteristic corresponding to the other two said spectral components.

10. Spectrophotometer apparatus according to claim 9 wherein said means for disposing comprises a rotatable chopper wheel carrying said first and second filters to alternately dispose said filters in said beams, said chopper wheel further comprising a transparent opening for passing said beams alternately therethrough.

11. Spectrophotometer apparatus according to claim 9 wherein said spectral band image converter means further comprises:
radiation dispersing means incident to said beam for dispersing said beam into a predetermined spectrum, and
imaging means in optical alignment with said radiation dispersing means for imaging said spectrum into said spectral image.

12. Spectrophotometer apparatus according to claim 11 wherein said radiation dispersing means is of the plane diffraction grating type.

13. The method of performing spectral analysis comprising the steps of:
providing at least one beam of radiation having a predetermined spectral bandwidth characteristic;
converting said beam to a spectral image;

selectively irradiating a predetemined array of electrically scannable detectors with at least two portions of said spectral image, one of said portions being associated with a predetermined first spectral range, the other of said portions being associated with a predetermined second spectral range, said first and second ranges including mutually exclusive first and second spectral components, respectively, said first and second ranges having a common spectral component intermediate of said first and second spectral components, and calibrating said detectors for said first and second ranges, said step of calibrating including disposing at least first and second narrow band optical filters in a predetermined manner in the path of said radiation beam, said first and second filters being single and double narrow bandpass types, respectively, said first filter having a spectral transmission characteristic corresponding to one of the three said spectral components and said second filter having a spectral transmission characteristic corresponding to the other two said spectral components.

14. The method of claim 12 further comprising the step of alternately disposing said first and second filters in said path of said beam.

* * * * *